United States Patent [19]
Yuhi et al.

[11] Patent Number: 5,235,230
[45] Date of Patent: Aug. 10, 1993

[54] MINIATURE MOTOR TERMINAL

[75] Inventors: Toshiya Yuhi; Masakazu Ikegami, both of Matsudo, Japan

[73] Assignee: Mabuchi Motor Co., Ltd., Chiba, Japan

[21] Appl. No.: 857,385

[22] Filed: Mar. 25, 1992

[30] Foreign Application Priority Data

Mar. 26, 1991 [JP] Japan .................. 3-18457[U]

[51] Int. Cl.[5] ............................................. H02K 11/00
[52] U.S. Cl. .................................... 310/71; 310/249; 439/856
[58] Field of Search ............. 310/71, 43, 40 MM, 90, 310/85, 249, 248, 239, 240, 242, 247; 439/856, 857, 858

[56] References Cited
U.S. PATENT DOCUMENTS

| | | | |
|---|---|---|---|
| 4,720,276 | 1/1988 | Takahashi | 439/856 |
| 4,873,464 | 10/1989 | Wang | 310/249 |
| 4,926,081 | 5/1990 | DiFlora et al. | 310/71 X |

FOREIGN PATENT DOCUMENTS 2202998 10/1988 United Kingdom .................. 310/71

Primary Examiner—Steven L. Stephan
Assistant Examiner—Ed To
Attorney, Agent, or Firm—McGlew and Tuttle

[57] ABSTRACT

A miniature motor in which female terminals are substantially embedded in an end cap, and brush arms and the female terminals are electrically connected to each other via internal terminals provided on the inside end face of the end cap; the female terminals are formed into a substantially h longitudinal section; contact ridges for making contact with male terminals to be connected are provided on both sides of the opposed inside surfaces of the female terminals in such a fashion as to protrude in a longitudinally staggered arrangement; the bifurcated ends of the female terminals face the outside end face of the end cap; and the area near both ends of the female terminal in the longitudinal direction is supported by the inside surface of a hole provided on the end cap.

12 Claims, 3 Drawing Sheets

FIG. I
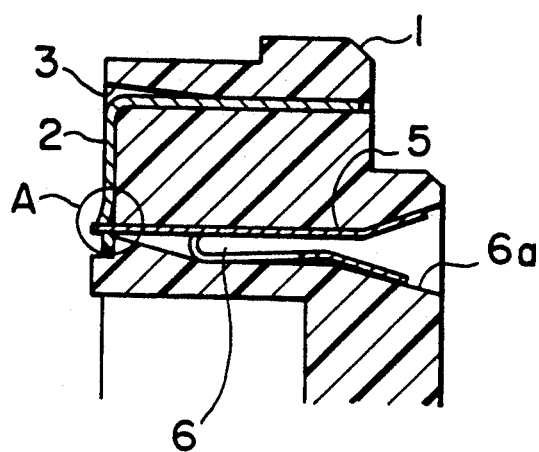
FIG. 2
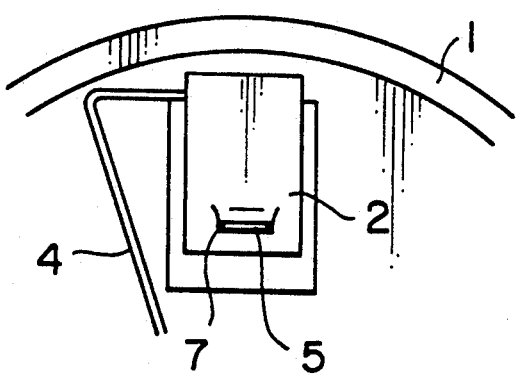

MINIATURE MOTOR TERMINAL

BACKGROUND OF THE INVENTION

This invention relates generally to a miniature motor used for audio and video equipment and automotive electrical equipment, and more particularly to a miniature motor which is easy to assemble and has improved electrical reliability in connecting to external terminals.

DESCRIPTION OF THE PRIOR ART

FIG. 9 is a longitudinal sectional view illustrating the essential part of a miniature motor to which this invention is applied. In FIG. 9, a housing 31 is formed of a metallic material, such as mild steel, into a bottomed hollow cylindrical shape, on the inner circumferential surface of which a permanent magnet 32 having an arc-segment shape is fixedly fitted. An end cap 33 is formed of a thermoplastic resin material in such a manner as to fit to the opening of the housing 31.

A rotor 34 consists of an armature 35 facing the permanent magnet 32 and a commutator 36, and is rotatably supported by bearings 37 and 38 provided on the housing 31 and the end cap 33.

A brush arm 39 is formed of an electrically conductive material into a strip shape. The brush arm 39 has a brush (not shown) for making sliding contact with the commutator 36, and is provided in the end cap 33. In the end cap 33, there is a female terminal (not shown) electrically connected to the brush arm 39. The female terminal, when engaged with the male terminal (not shown), allows power to be fed from an external d-c power source to the armature 35 via the brush arms 39, the brushes and the commutator 36.

With the above-mentioned construction, when current is fed from an external d-c power source to the armature 35 via the brush arms 39, rotating force is generated in the armature 35 that is present in a magnetic field formed by the permanent magnet 32 fixedly fitted to the inner circumferential surface of the housing 31. As a result, the rotor 34 is caused to rotate, driving various equipment connected to the rotor 34.

FIG. 8 is a perspective view illustrating an end cap of a conventional type. The end cap is described in Japanese Published Unexamined Utility Model Application No. 18266/1988 corresponding to U.S. Pat. No. 4,873,464, for example, and corresponds with the end cap 33 shown in FIG. 9.

In FIG. 8, there is a brush arm 23 having a brush 22 and a female terminal 24 are provided in an end cap 21. The female terminal 24 is formed by bending a strip of an electrically conductive material into the shape of the letter S or Z, with a U-shaped portion provided continually on the tip thereof. The U-shaped portion provided on the female terminal 24 is fitted into a recess 25 provided on the outside surface of the end cap 21.

The female terminal 24 and the brush arm 23 are electrically connected by rivets and other connecting means. By engaging a male terminal (not shown) with a U-shaped opening 26 formed on the female terminal 24, power is fed from an external d-c power source to the armature 35 via the brush arms 23, as noted earlier.

With the construction of the end cap 21 in the miniature motor of the conventional motor, however, the female terminal 24 is exposed to the outside surface of the end cap 21. When the end cap 21 is used in conjunction with, or connected to other components, the female terminal 24 tends to be involved with unwanted accidents, such as shortcircuiting or leakage, by accidentally coming in contact with other components. To avoid these accidents, it is necessary to provide a sufficient space or interpose an insulating material between the female terminal 24 and the other components to prevent shortcircuiting.

This construction, however, not only hampers the down-sizing of miniature motors, but also increases the number of components and complicates assembly operations, leading to increased manufacturing cost.

In the meantime, slight resiliency is usually imparted to the U-shaped opening 26 of the female terminal 24 to ensure positive engagement with the male terminal. The U-shaped opening 26 of the female terminal 24 having the so-called contileversed support construction, however, tends to lose resiliency because it receives load unevenly when engaged with the male terminal. This could result in unstable electrical connection and lowered reliability.

Attempts to increase the rigidity and resiliency of the U-shaped opening 26 to stabilize the engagement of the female terminal with the male terminal could inevitably increase the thickness of the components, leading to increased manufacturing cost.

SUMMARY OF THE INVENTION

This invention is intended to overcome problems associated with the prior art. It is an object of this invention to provide a miniature motor which has been improved to increase electrical reliability in connecting to external terminals.

The miniature motor of this invention comprises a housing formed into a bottomed hollow cylindrical shape and having a permanent magnet fixedly fitted to the inner circumferential surface thereof, a rotor having an armature facing the permanent magnet and a commutator, and an end cap fitted to the opening of the housing and having brush arms equipped with brushes for making sliding contact with the commutator, and female terminals electrically connected to the brush arms. The rotor is rotatably supported by bearings provided on the housing and the end cap, and the female terminals are substantially embedded in the end cap. The brush arms and the female terminals are electrically connected to each other via internal terminals provided on the inside end face of the end cap.

Furthermore, the miniature motor of this invention has such a construction that female terminals are substantially embedded in an end cap, and that brush arms and the female terminals are electrically connected to each other via internal terminals provided on the inside end face of the end cap. The female terminals are formed into a substantially h longitudinal section. Contact ridges for making contact with male terminals are provided on both sides of the opposed inside surfaces of the female terminals in such a manner as to protrude in a longitudinally staggered arrangement. The bifurcated ends of the female terminals face the outside end face of the end cap and the area near both ends of the female terminal in the longitudinal direction is supported by the inside surface of a hole provided on the end cap.

Furthermore, in the miniature motor of this invention, a female terminal is formed by providing a punched portion consisting of one slit extending longitudinally in the middle of a strip of an electrically conductive material, and the other slit orthogonally intersecting and connecting with the former slip, and bending one shorter side towards the other shorter side.

Furthermore, ends of the female terminals may be inserted into holes provided on internal terminals in the miniature motor of this invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 1 is an enlarged cross-sectional view illustrating the essential part of an end cap in an embodiment of this invention.

FIG. 2 is an enlarged inside end view of the essential part of an end cap in an embodiment of this invention.

DETAILED DESCRIPTION OF THE EMBODIMENT

Figure 8:
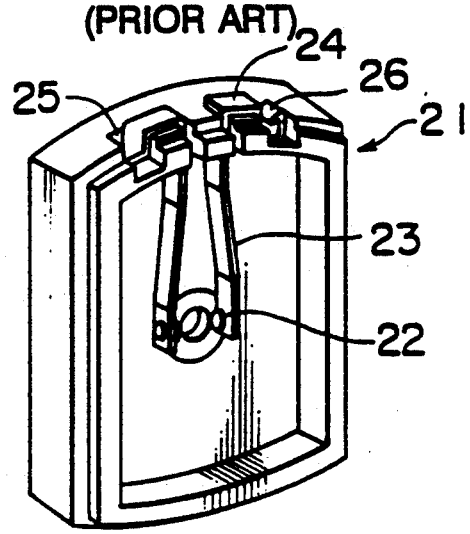
FIG. 8 is a prior art end cap.
Figure 9:
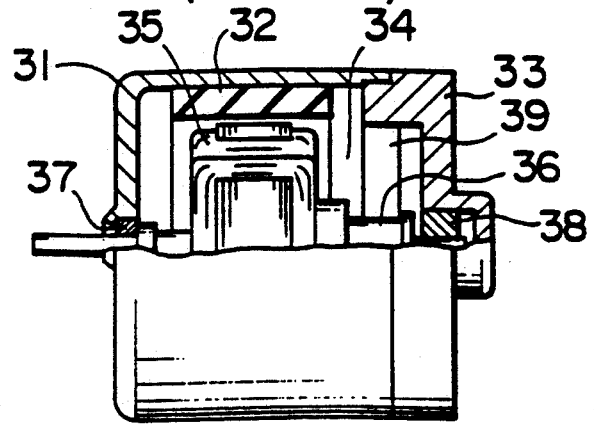
FIG. 9 is a prior art motor.

FIGS. 1 and 2 are an enlarged longitudinal sectional view and an enlarged inside end view illustrating the essential part of an end cap in an embodiment of this invention. In FIGS. 1 and 2, an end cap 1 is formed of a thermoplastic or thermoset resin material having insulating properties into a strip or cylindrical shape corresponding to the shape of a housing (not shown) to be engaged with, as in the case of FIGS. 8 and 9 above.

An internal terminal 2 is formed of a copper plate, for example, into the shape of the letter L, and is fitted to the end cap by inserting the part thereof into a hole 3 provided on the end cap 1. A pair of brush arms 4 and internal terminals 2 are electrically connected to each other by rivets, soldering or other means. The brush arm 4 and the internal terminal 2 also can be formed integrally of the same material.

The female terminal 5 is formed of an electrically conductive material, such as a copper strip, into a shape as will be described later, and is fitted into a hole 6 provided on the end cap 1. After the rear end of the female terminal 5 is inserted into a terminal hole or bore 7 provided on the internal terminal 2, the female terminal 5 is electrically and mechanically connected to the internal terminal 2 by soldering, bending, staking and other means.

Figure 3:
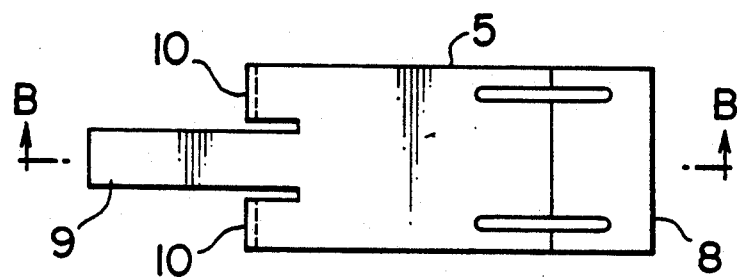
FIG. 3 is a plan view illustrating the female terminal shown in FIGS. 1 and 2.
Figure 4:
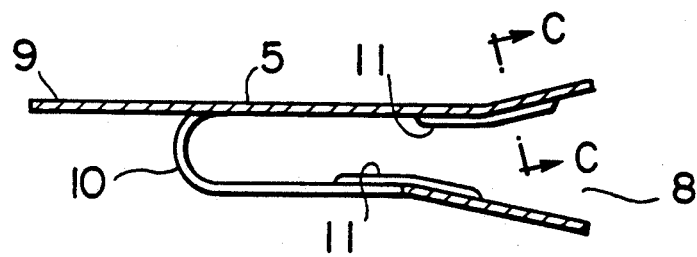
FIG. 4 is a cross-sectional view taken along line B—B in FIG. 3.
Figure 5:
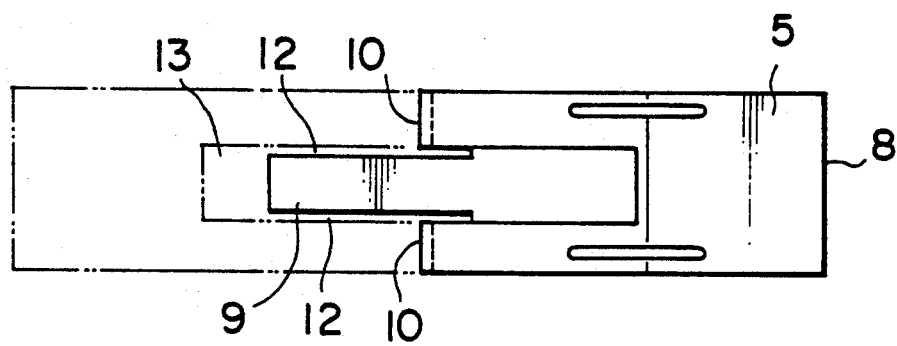
FIG. 5 is a bottom view illustrating the female terminal shown in FIGS. 1 and 2.
Figure 6:
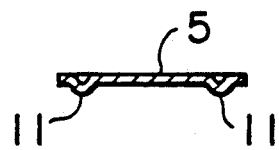
FIG. 6 is a cross-sectional view taken along line C—C in FIG. 4.

FIGS. 3 and 5 are plan and bottom views illustrating the female terminal 5 shown in FIGS. 1 and 2. FIG. 4 is a cross-sectional view taken along line B—B in FIG. 3. FIG. 6 is a cross-sectional view taken along line C—C in FIG. 4.

In these figures, the female terminal 5 is formed into the shape of substantially the letter h in longitudinal section, as shown in FIG. 4, and consists of a bifurcated end 8 at one end thereof, a formed rear end or tail portion 9 at the other end thereof, and a bent portion 10 in the middle thereof.

Contact ridges 11 are provided on both sides of the opposed inside surfaces of the bifurcated end 8 in such a manner as to be longitudinally staggered with each other. That is, the contact ridges 11 are provided in such a manner that the positions of the opposed contact ridges 11 are staggered longitudinally, as shown in FIG. 4. The female terminal 5 of this construction, when engaged with the male terminal (not shown), makes contact more positively with the male terminal by the action of the contact ridges 11 provided on both sides of the bifurcated end 8.

The female terminal of the aforementioned construction can be manufactured easily by stamping, for example. That is, first slits 12 extending longitudinally and a second slit 13 orthogonally intersecting and connecting to the first slits 12 are provided in the middle of a strip material, as shown by solid and dotted lines to form the rear end 9, as shown in FIG. 5. The first and second slits forming a U-shaped cutout. The strip material is then folded into halves at the bent portion 10, with the rear end 9 left as it is, as shown in FIG. 4. The contact ridges 11 are formed before, or at the time of, the punching of the punched portion. In FIG. 5, although description has been made about the case where the strip material is formed into a substantially U shape, a single slit 12 and another slit 13 joining the long side of the slit 12 may be punched to form a substantially L-shaped punched portion.

Figure 7:
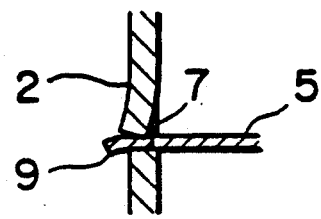
FIG. 7 is an enlarged view of part A in FIG. 1.

FIG. 7 is an enlarged view of the A portion in FIG. 1. Like parts are indicated by like numerals in FIG. 1. The female terminal 5 and the internal terminal 2 are electrically and mechanically connected positively to each other by inserting the rear end 9 of the female terminal 5 formed in the above-mentioned manner into the terminal hole 7 provided on the internal terminal 2 and staking the area near the terminal hole 7. When effecting the above connection, the rear end 9 of the female terminal 5 may be merely bent, or bent and staked. Furthermore, the rear end 9 of the female terminal may also be connected by soldering, instead of staking and/or bending, or by a combination of soldering and the other connecting means described above.

With the above construction, the female terminal 5 is fitted into the hole 6 provided on the end cap 1 and supported by the inside surface of the hole 6 at least at the bifurcated end 8 and the rear end 9, as shown in FIG. 1. This two-point support keeps the female terminal 5 stable even when engaged with the male terminal (not shown). Forming the opening 6a of the hole 6 into a tapered shape would facilitate the insertion of the male terminal.

As shown in FIG. 4, the female terminal 5 is formed into a substantially h longitudinal section, and the contact ridges 11 are provided facing each other on both sides of the opposed inside surfaces of the female terminal 5. This makes an electrical connection with the male terminal extremely stable. That is, imparting a desired degree of resiliency to the female terminal 5 and provision of the contact ridges 11 in a direction opposite to each other induces the elastic deformation of the male terminal when engaged with the female terminal 5, resulting in improved electrical connection and resistance to pull-out.

As described in detail in the foregoing, this invention has the following effects.

(1) Since the components of the female terminal are not exposed to the surface of the end cap, there is no fear of shortcircuiting or leakage due to their contact with other components. Furthermore, the construction in which the components of the female terminal are embedded in the hole of the end cap can reduce the number of parts, leading to reduced the size and manufacturing cost of miniature motors.

(2) Since the female terminal can be positioned and fixedly fitted merely by inserting into a hole provided on the end cap, and connecting to the internal terminal, assembly operation can be greatly facilitated.

(3) The reliability of the motor can be improved because electrical connection between the female and male terminals is stable.

(4) The desired resiliency and resistance to pull-out of the female terminal can be maintained even when the thickness of the components is reduced. This helps reduce the manufacturing cost of miniature motors.

While specific embodiments of the invention have been shown and described in detail to illustrate the application of the principles of the invention, it will be understood that the invention may be embodied otherwise without departing from such principles.

What is claimed is:

1. A motor terminal comprising:
   a housing;
   a permanent magnet positioned on an inner circumference of said housing;
   a rotor positioned inside said housing and including a commutator and an armature facing said permanent magnet;
   an end cap positioned on an end of said housing, said end cap including brush arms means for making sliding electrical contact with said commutator, said brush arm means being electrically connected to an internal terminal having an end surface along an inside end face of said end cap, said internal terminal defining a terminal bore, said end cap also including a female terminal having a substantially h-shaped longitudinal section with a tail portion, said female terminal being substantially embedded in said end cap, said tail portion of said female terminal being inserted into said terminal bore of said internal terminal and electrically connecting said female terminal to said internal terminal; and
   bearing means positioned on said housing and said end cap for rotatably supporting said rotor.

2. A miniature motor as set forth in claim 1 wherein said female terminal is formed into a substantially h longitudinal section, said female terminal includes contact ridge means for making contact with a male terminal, said contact ridge means being provided on opposed inside surfaces of said female terminal in a longitudinally staggered arrangement, bifurcated ends of said female terminal are disposed to face an outside end face of said end cap, and at least areas near longitudinal ends of said female terminal are supported by an inside surface of a hole defined by said end caps.

3. A miniature motor as set forth in claim 1 or 2 wherein each piece of said female terminal is formed by punching first slits extending longitudinally, and a second slit orthogonally intersecting and connecting to said first slits in a middle part of a strip made of an electrically conductive material, and by bending said strip material towards a short side thereof.

4. A motor terminal comprising:
   a housing;
   a rotor positioned inside said housing and including a commutator;
   an end cap positioned on an end of said housing and defining a hole having openings on an inside surface and an outside surface of said end cap;
   brush arms means positioned on said end cap and for making sliding-electrical contact with said commutator;
   an internal terminal positioned on said inside surface of said end cap, said brush arm means being electrically connected to said internal terminal, said internal terminal defining a terminal bore adjacent said hole in said end cap; and
   a female terminal having a substantially h-shaped longitudinal section with a tail portion, said female terminal being positioned in said hole of said end cap, said tail portion of said female terminal being inserted into said terminal bore of said internal terminal and electrically connecting said female terminal to said internal terminal.

5. A miniature motor in accordance with claim 4, wherein:
   said female terminal is an integral strip of conductive material defining a substantially U-shaped cutout, said tail portion of said female terminal extending into said substantially U-shaped cutout, said integral strip including a bend in an area of said U-shaped cutout.

6. A motor terminal in accordance with claim 5, wherein:
   said bend is substantially 180°.

7. A motor terminal in accordance with claim 5, wherein:
   said bend is in leg sections of said substantially U-shaped cutout, said tail portion being substantially straight.

8. A motor terminal in accordance with claim 5, wherein:
   said bend forms bifurcated ends of said female terminals.

9. A motor terminal in accordance with claim 8, wherein:
   a first portion of one of said bifurcated ends is supported by an inside surface of said hole of said end cap to cause a second portion of said bifurcated ends to resiliently cause elastic deformation of a male terminal when said male terminal is engaged with said female terminal.

10. A motor terminal in accordance with claim 9, wherein:
    said first portion is an end portion of said one of said bifurcated ends, and said second portion is a portion between said bend and said end portion.

11. A motor terminal in accordance with claim 5, wherein:
    said bend forms said female terminal into a substantially h-like shape with an open section of said substantially h-like shape facing toward said outer surface of said end cap.

12. A motor terminal in accordance with claim 4, wherein:
    said female terminal is recessed below said outer surface of said end cap.

* * * * *